United States Patent
Nakaminami et al.

(10) Patent No.: US 6,697,700 B2
(45) Date of Patent: Feb. 24, 2004

(54) CORRECTION APPARATUS FOR NC LATHE

(75) Inventors: Masamitsu Nakaminami, Yamatokoriyama (JP); Tomoki Inui, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 10/338,650

(22) Filed: Jan. 9, 2003

(65) Prior Publication Data

US 2003/0131698 A1 Jul. 17, 2003

(30) Foreign Application Priority Data

Jan. 15, 2002 (JP) ........................................ 2002-005755

(51) Int. Cl.[7] .............................................. G06F 19/00
(52) U.S. Cl. .................... 700/194; 700/159; 700/187; 700/188; 700/189; 318/569; 409/80
(58) Field of Search ................................ 700/159, 187, 700/188, 189, 194; 318/569; 409/80

(56) References Cited

U.S. PATENT DOCUMENTS 4,370,720 A * 1/1983 Hyatt ........................ 700/194
5,544,046 A * 8/1996 Niwa ........................ 700/159
5,808,434 A * 9/1998 Kokura et al. .............. 318/569

FOREIGN PATENT DOCUMENTS

| JP | 10-15736 | 1/1998 | |
| JP | 2000347713 A | * 12/2000 | ............ G05B/19/18 |
| JP | 2000353006 A | * 12/2000 | ....... G05B/19/4103 |

* cited by examiner

Primary Examiner—Leo Picard
Assistant Examiner—W. Russell Swindell
(74) Attorney, Agent, or Firm—Westerman, Hattori, Daniels & Adrian, LLP (57) ABSTRACT

A correction apparatus 1 comprises a correction amount setting section 3 and a correction execution section 4 and provides in an NC lathe 100 equipped with a first tool rest 106 and a second tool rest 108 which are movable in the X-axis direction and in the Z-axis direction. The correction amount setting section 3 sets correction amounts for canceling the displacement of the second tool rest 108 in the X-axis direction caused depending on the position of the first tool rest 106 in the Z-axis direction and for canceling the displacement of the first tool rest 106 in the X-axis direction caused depending on the position of the second tool rest 108 in the Z-axis direction. The correction execution section 4 corrects movement target position data regarding the first tool rest 106 and the second tool rest 108 in the X-axis direction on the basis of the correction amounts.

2 Claims, 5 Drawing Sheets

Correction amount (Xaij) of first tool rest in Xa-axis direction

| | | Position of first tool rest in Za-axis direction (mm) | | | | | |
|---|---|---|---|---|---|---|---|
| | | i=0 | i=1 | i=2 | i=3 | i=4 | ... | i=10 |
| | | 0 | 100 | 200 | 300 | 400 | ... | 1000 |
| Position of second tool rest in Zb-axis direction (mm) | j=0 | 0 | ** | ** | ** | ** | ** | ** |
| | j=1 | 100 | ** | ** | ** | ** | ** | ** |
| | j=2 | 200 | −7 μm | −6.3 μm | −5.6 μm | −4.9 μm | −4.2 μm | ... | 0 μm |
| | j=3 | 300 | ** | ** | ** | ** | ** | ** |
| | j=4 | 400 | ** | ** | ** | ** | ** | ** |
| | j=5 | 500 | ** | ** | ** | ** | ** | ** |
| | j=6 | 600 | ** | ** | ** | ** | ** | ** |
| | j=7 | 700 | ** | ** | ** | ** | ** | ** |
| | j=8 | 800 | ** | ** | ** | ** | ** | ** |
| | j=9 | 900 | ** | ** | ** | ** | ** | ** |
| | j=10 | 1000 | ** | ** | ** | ** | ** | ** |

FIG. 5

Correction amount (Xbij) of second tool rest in Xb-axis direction

| Position of second tool rest in Zb-axis direction (mm) | | Position of first tool rest in Za-axis direction (mm) | | | | | | |
|---|---|---|---|---|---|---|---|---|
| | | i=0 | i=1 | i=2 | i=3 | i=4 | ... | i=10 |
| | | 0 | 100 | 200 | 300 | 400 | ... | 1000 |
| j=0 | 0 | ** | ** | ** | ** | ** | ... | ** |
| j=1 | 100 | ** | ** | ** | ** | ** | ... | ** |
| j=2 | 200 | ** | ** | ** | ** | ** | ... | ** |
| j=3 | 300 | ** | ** | ** | ** | ** | ... | ** |
| j=4 | 400 | ** | ** | ** | ** | ** | ... | ** |
| j=5 | 500 | ** | ** | ** | ** | ** | ... | ** |
| j=6 | 600 | ** | ** | ** | ** | ** | ... | ** |
| j=7 | 700 | ** | | | ** | ** | ... | ** |
| j=8 | 800 | ** | | | | ** | ... | ** |
| j=9 | 900 | ** | | | | | ... | ** |
| j=10 | 1000 | ** | | | | | ... | ** |

CORRECTION APPARATUS FOR NC LATHE

BACKGROUND OF THE INVENTION

1. Field of the Invention

The present invention relates to a correction apparatus for an NC lathe equipped with a spindle, at least two tool rests provided so as to be movable in the direction along the axis of the spindle and in the direction perpendicular to the axis of the spindle, feed mechanisms for moving each of the tool rests in the above-mentioned directions, and a feed controller for generating movement target position data regarding each of the tool rests, for numerically controlling the feed mechanisms on the basis of the generated movement target position data and for moving each of the tool rests to its movement target position, the correction apparatus being used to correct the movement target position of each of the tool rests.

2. Description of the Prior Art

An NC lathe comprises a bed, a spindle stock provided on the bed and rotatably supporting a spindle, a Z-axis guide mechanism provided on the bed to guide in the direction (the Z-axis direction) along the axis of the spindle, a saddle guided by the Z-axis guide mechanism so as to be movable in the Z-axis direction, an X-axis guide mechanism provided on the saddle to guide in the direction (the X-axis direction) perpendicular to the axis of the spindle, a tool rest mounted on the saddle and guided by the X-axis guide mechanism so as to be movable in the X-axis direction, a Z-axis feed mechanism for moving the saddle in the Z-axis direction, an X-axis feed mechanism for moving the tool rest in the X-axis direction, a feed controller (numerical controller) for numerically controlling the operations of the X-axis feed mechanism and the Z-axis feed mechanism, and the like.

The numerical control is carrying out on the basis of NC programs having been created in advance. More specifically, the NC programs are analyzed sequentially by the feed controller, and command signals regarding the movement positions and feed speeds of the tool rest are extracted. On the basis of the extracted command signals, movement target position data (operation command signals) is generated. On the basis of the generated operation command signals, the X-axis feed mechanism and the Z-axis feed mechanism are feedback controlled.

The tool rest and the saddle are required to have sufficient rigidity so that machining can be carried out stably. Hence, they have considerable weights. For this reason, when the tool rest and the saddle are moved, the form of the bed is changed by the movement. This changes the positional relationship between the spindle and the tool rest and impairs the rectilinearity of the tool rest in the Z-axis direction and the X-axis direction, thereby lowering machining accuracy.

In order that the rectilinearity of the tool rest is within a predetermined allowable range in the prior art, when the tool rest is moved in the Z-axis direction for example, the X-axis direction position of the tool rest is corrected so that the displacement of the tool rest with respect to the spindle, caused depending on the movement position of the tool rest, can be canceled.

The structure of the NC lathe, however, is not limited to the above-mentioned structure comprising the tool rest, the saddle and the one set of the X-axis feed mechanism and the Z-axis feed mechanism for driving these. An NC lathe comprising a plurality of tool rests and the like is available.

In an NC lathe having this kind of structure, when one of the tool rests and the saddle thereof are moved, the positional relationship between the spindle and the other tool rests is changed. This lowers machining accuracy because of a reason similar to that described above.

In the NC lathe comprising the plurality of tool rests and the like in the prior art, when one of the tool rests is moved, the positions of the other tool rests are changed, but no means is taken to correct the changes of the positions. It is thus impossible to improve the machining accuracy of the NC lathe.

Accordingly, the present invention is intended to provide a correction apparatus for an NC lathe equipped with a plurality of tool rests and the like, being capable of correcting the displacement of each tool rest caused by the positional relationship among the tool rests so that the rectilinearity of each tool rest can be raised and so that the machining accuracy of the NC lathe can be improved.

SUMMARY OF THE INVENTION

In order to attain the above-mentioned object, the present invention relates to a correction apparatus for an NC lathe equipped with a spindle, at least two tool rests provided so as to be movable in the direction along the axis of the spindle and in the direction perpendicular to the axis of the spindle, feed mechanisms for moving each of the tool rests in the above-mentioned directions, and a feed controller for generating movement target position data regarding each of the tool rests, for numerically controlling the feed mechanisms on the basis of the generated movement target position data and for moving each of the tool rests to its movement target position, the correction apparatus for correcting the movement target positions of the tool rests, the movement positions of which are numerically controlled on the basis of the movement target position data, comprising:

a correction amount setting section for receiving the movement target position data from the feed controller, for recognizing the position of each of the tool rests in the direction along the axis of the spindle and/or in the direction perpendicular to the axis of the spindle on the basis of the received movement target position data, and for setting correction amounts for canceling the displacements of the other tool rest in the direction along the axis of the spindle and/or in the direction perpendicular to the axis of the spindle caused depending on the position of the one of the tool rests in the direction along the axis of the spindle and/or in the direction perpendicular to the axis of the spindle, and a correction execution section for correcting the movement target position data for the other tool rest on the basis of the correction amounts having been set by the correction amount setting section.

According to the present invention, the movement target position data for each of at least two tool rests is generated by the feed controller, and each of the feed mechanisms is numerically controlled on the basis of the generated movement target position data. Hence, each of the tool rests is moved to a movement target position in the direction along the axis of the spindle and in the direction perpendicular to the axis of the spindle by the feed mechanisms.

In an NC lathe equipped with a plurality of tool rests as described above, each of the tool rests usually has a considerable weight. For this reason, the form of the bed of the NC lathe is changed as each of the tool rests is moved.

Therefore, when one of the tool rests is moved in the direction along the axis of the spindle for example, depending on the movement position thereof, the position of the other tool rest is displaced in the direction along the axis of the spindle or in the direction perpendicular to the axis of the spindle. Similarly, when the other tool rest is moved in the direction along the axis of the spindle, depending on the movement position thereof, the position of the one of the tool rests is displaced in the direction along the axis of the spindle or in the direction perpendicular to the axis of the spindle.

When the displacements of the tool rests are caused as described above, the positional relationship between the spindle and the tool rests is changed. This impairs the rectilinearity of the tool rests in the direction along the axis of the spindle and/or in the direction perpendicular to the axis of the spindle, thereby lowering machining accuracy.

To solve this problem, the correction amount setting section of the present invention sets correction amounts for canceling the displacements of the other tool rest caused in the direction along the axis of the spindle and/or in the direction perpendicular to the axis of the spindle depending on the position of the one of the tool rests in the direction along the axis of the spindle and/or in the direction perpendicular to the axis of the spindle. In addition, the correction execution section of the present invention corrects the movement target position data for the other tool rest on the basis of the correction amounts having been set by the correction amount setting section. As a result, the rectilinearity of each of the tool rests can be within a predetermined allowable range, and machining accuracy can be improved.

In addition, the correction apparatus of the present invention further comprises a correction amount storage section for storing the correction amounts for canceling the displacements of the other tool rest in the direction along the axis of the spindle and/or in the direction perpendicular to the axis of the spindle caused depending on the position of the one of the tool rests in the direction along the axis of the spindle and/or in the direction perpendicular to the axis of the spindle.

The correction amount setting section searches data stored in the correction amount storage section on the basis of the movement target position data regarding each of the tool rests, which is received from the feed controller. Furthermore, the correction amount setting section reads correction amounts corresponding to the positions of the one of the tool rests in the direction along the axis of the spindle and/or in the direction perpendicular to the axis of the spindle, and sets correction amounts for correction execution on the basis of the correction amounts having been read.

As described above, when one of the tool rests is moved in the direction along the axis of the spindle, depending on the movement position thereof, the position of the other tool rest in the direction along the axis of the spindle or in the direction perpendicular to the axis of the spindle is displaced. Similarly, when the other tool rest is moved in the direction along the axis of the spindle, depending on the movement position thereof, the position of the one of the tool rests in the direction along the axis of the spindle or in the direction perpendicular to the axis of the spindle is displaced.

To solve this problem, in the present invention, the one of the tool rests is moved every predetermined interval in the direction along the axis of the spindle for example, and the displacement amount of the other tool rest in the direction along the axis of the spindle or in the direction perpendicular to the axis of the spindle caused depending on each of the movement positions thereof is measured in advance. On the basis of the measured displacement amount, a correction amount for canceling this is set and stored in the correction amount storage section in advance. Furthermore, the correction amount setting section reads the correction amount corresponding to the movement target position of each of the tool rests from the correction amount storage section. On the basis of this, the correction amount setting section sets a correction amount for executing correction. Therefore, the present invention can also have effects similar to those described above.

The displacement amount of the other tool rest in the direction along the axis of the spindle or in the direction perpendicular to the axis of the spindle caused depending on each movement position of the one of the tool rests in the direction perpendicular to the axis of the spindle can also be measured in a way similar to that described above. In addition, a correction amount for canceling this displacement amount can also be set and stored in the correction amount storage section in advance. Furthermore, a correction amount for canceling the displacement amount of the one of the tool rests in the direction along the axis of the spindle or in the direction perpendicular to the axis of the spindle caused depending on each movement position of the other tool rest in the direction along the axis of the spindle or in the direction perpendicular to the axis of the spindle can be set in a way similar to that described above, and can be stored in the correction amount storage section in advance.

Furthermore, when the movement target position of each of the tool rests does not correspond to the movement position at which the displacement amount is measured, the correction amount of the movement target position can be calculated and set by carrying out interpolation or the like on the basis of the correction amounts of the movement positions at which the displacement amounts were measured.

DESCRIPTION OF THE PREFERRED EMBODIMENT

Figure 1:
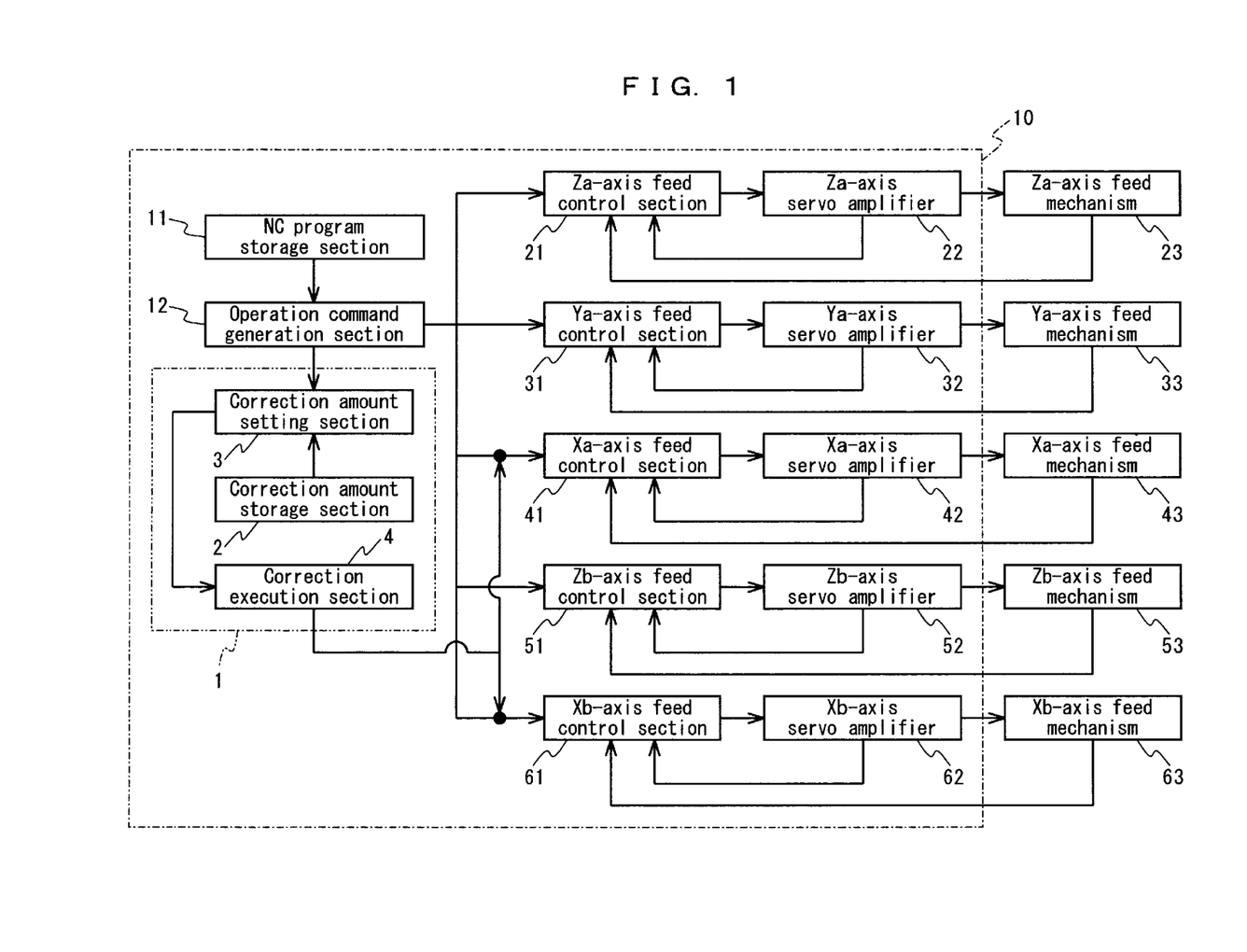
FIG. 1 is a block diagram showing the schematic configuration of a correction apparatus and the like in accordance with an embodiment of the present invention.

A preferred embodiment of the present invention will be described below referring to the accompanying drawings. FIG. 1 is a block diagram showing the schematic configuration of a correction apparatus and the like in accordance with an embodiment of the present invention. As shown in FIG. 1, a correction apparatus 1 in accordance with this embodiment is provided inside a numerical controller 10 comprising a CPU, a ROM, a RAM, a hard disk, etc., and the correction apparatus 1 comprises a correction amount storage section 2, a correction amount setting section 3, a correction execution section 4, etc.

Figure 2:
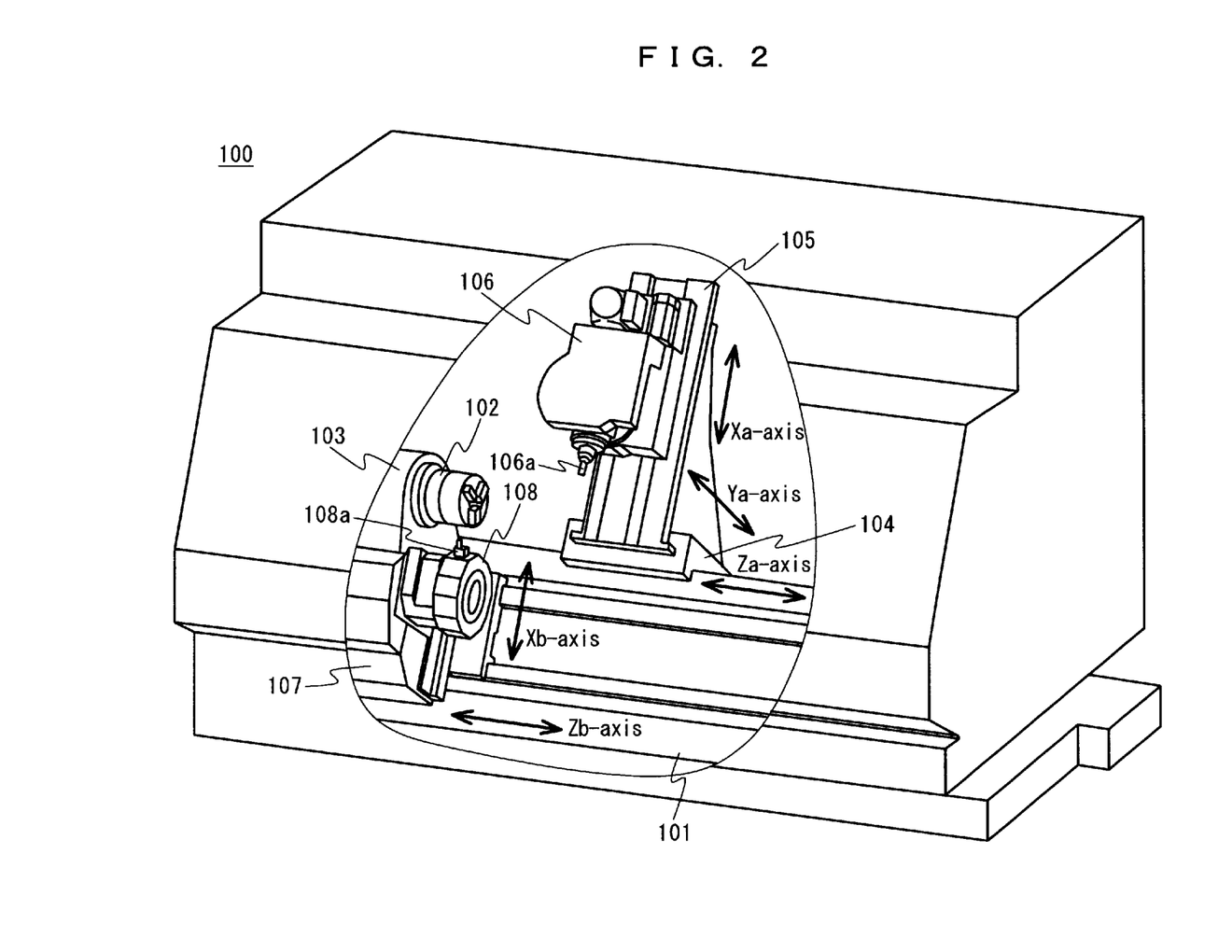
FIG. 2 is a perspective view showing the schematic configuration of an NC lathe equipped with the correction apparatus in accordance with this embodiment.

In the following descriptions, it is assumed that the numerical controller 10 is configured to control the various mechanisms of an NC lathe 100 shown in FIG. 2. The NC lathe 100 comprises a bed 101, a spindle stock 103 provided on the bed 101 and rotatably supporting a spindle 102, a first saddle 104 provided on the bed 101 and movable in an arrow-indicated Za-axis direction, a second saddle 105 provided on the first saddle 104 and movable in an arrow-indicated Ya-axis direction, a first tool rest 106 supported by the second saddle 105, holding a tool 106a and movable in an arrow-indicated Xa-axis direction, a third saddle 107 provided on the bed 101 and movable in an arrow-indicated Zb-axis direction, a second tool rest 108 supported by the third saddle 107, holding a tool 108a and movable in an arrow-indicated Xb-axis direction, etc.

In addition, the NC lathe 100 comprises a Za-axis feed mechanism 23, a Ya-axis feed mechanism 33, an Xa-axis feed mechanism 43, a Zb-axis feed mechanism 53 and an Xb-axis feed mechanism 63 shown in FIG. 1. The Za-axis feed mechanism 23 moves the first saddle 104 in the Za-axis direction. The Ya-axis feed mechanism 33 moves the second saddle 105 in the Ya-axis direction. The Xa-axis feed mechanism 43 moves the first tool rest 106 in the Xa-axis direction. The Zb-axis feed mechanism 53 moves the third saddle 107 in the Zb-axis direction. The Xb-axis feed mechanism 63 moves the second tool rest 108 in the Xb-axis direction.

The numerical controller 10 comprises an NC program storage section 11, an operation command generation section 12, a Za-axis feed control section 21, a Ya-axis feed control section 31, an Xa-axis feed control section 41, a Zb-axis feed control section 51, an Xb-axis feed control section 61, a Za-axis servo amplifier 22, a Ya-axis servo amplifier 32, an Xa-axis servo amplifier 42, a Zb-axis servo amplifier 52, an Xb-axis servo amplifier 62, etc. In addition, the Za-axis feed mechanism 23, the Ya-axis feed mechanism 33, the Xa-axis feed mechanism 43, the Zb-axis feed mechanism 53 and the Xb-axis feed mechanism 63 are connected to the Za-axis servo amplifier 22, the Ya-axis servo amplifier 32, the Xa-axis servo amplifier 42, the Zb-axis servo amplifier 52 and the Xb-axis servo amplifier 62, respectively.

NC programs having been created in advance are stored in the NC program storage section 11 via an input device (not shown) or the like. The operation command generation section 12 generates movement target position data (operation command signals) regarding the first tool rest 106 and the second tool rest 108.

More specifically, NC programs stored in the NC program storage section 11 are analyzed sequentially to extract command signals regarding the movement positions, feed speeds, etc. of the first tool rest 106 and the second tool rest 108. Movement target position data (operation command signals) regarding the first tool rest 106 and the second tool rest 108 is then generated on the basis of the extracted command signals and tool offset amounts stored in a storage section (not shown). The generated movement target position data (operation command signals) is distributed and transmitted to the Za-axis feed control section 21, the Ya-axis feed control section 31, the Xa-axis feed control section 41, the Zb-axis feed control section 51 and the Xb-axis feed control section 61. Furthermore, the movement target position data (operation command signals), transmitted to the Za-axis feed control section 21 and the Zb-axis feed control section 51, is also transmitted to the correction amount setting section 3.

The Za-axis feed control section 21, the Ya-axis feed control section 31, the Xa-axis feed control section 41, the Zb-axis feed control section 51 and the Xb-axis feed control section 61 process operation command signals which are received from the operation command generation section 12, thereby generating the drive command signals.

More specifically, a speed command signal is first generated by multiplying the deviation between the operation command signal received from the operation command generation section 12 and a present position signal fed back from each of the Za-axis feed mechanism 23, the Ya-axis feed mechanism 33, the Xa-axis feed mechanism 43, the Zb-axis feed mechanism 53 and the Xb-axis feed mechanism 63 corresponding to the feed control sections 21, 31, 41, 51 and 61, respectively, by a position loop gain.

A current command signal is then generated by multiplying the deviation between the generated speed command signal and a present speed signal fed back from each of the Za-axis feed mechanism 23, the Ya-axis feed mechanism 33, the Xa-axis feed mechanism 43, the Zb-axis feed mechanism 53 and the Xb-axis feed mechanism 63 by a speed loop gain.

Next, a drive command signal is generated by multiplying the deviation between the generated current command signal and a present current signal fed back from each of the Za-axis servo amplifier 22, the Ya-axis servo amplifier 32, the Xa-axis servo amplifier 42, the Zb-axis servo amplifier 52 and the Xb-axis servo amplifier 62 corresponding to the feed control sections 21, 31, 41, 51 and 61, respectively, by a current loop gain.

The drive command signal is transmitted from each of the Za-axis feed control section 21, the Ya-axis feed control section 31, the Xa-axis feed control section 41, the Zb-axis feed control section 51 and the Xb-axis feed control section 61, converted from a digital signal into an analog signal by a D/A converter (not shown), and received by each of the Za-axis servo amplifier 22, the Ya-axis servo amplifier 32, the Xa-axis servo amplifier 42, the Zb-axis servo amplifier 52 and the Xb-axis servo amplifier 62, respectively. The received drive command signal is amplified by each of the servo amplifiers 22, 32, 42, 52 and 62, and transmitted to each of the Za-axis feed mechanism 23, the Ya-axis feed mechanism 33, the Xa-axis feed mechanism 43, the Zb-axis feed mechanism 53 and the Xb-axis feed mechanism 63.

The operation of each of the Za-axis feed mechanism 23, the Ya-axis feed mechanism 33, the Xa-axis feed mechanism 43, the Zb-axis feed mechanism 53 and the Xb-axis feed mechanism 63 is controlled on the basis of the drive command signal transmitted from each of the Za-axis servo amplifier 22, the Ya-axis servo amplifier 32, the Xa-axis servo amplifier 42, the Zb-axis servo amplifier 52 and the Xb-axis servo amplifier 62, respectively.

Furthermore, each of the Za-axis feed mechanism 23, the Ya-axis feed mechanism 33, the Xa-axis feed mechanism 43, the Zb-axis feed mechanism 53 and the Xb-axis feed mechanism 63 comprises a servomotor, a rotary encoder, a ball screw, etc. (these are not shown). The operation of the servomotor (not shown) is controlled on the basis of the drive command signal. By the operation of the servomotor (not shown), each of the first saddle 104, the second saddle 105, the first tool rest 106, the third saddle 107 and the second tool rest 108 is moved to each of the movement target positions in the Za-axis direction, the Ya-axis direction, the Xa-axis direction, the Zb-axis direction and the Xb-axis direction, respectively, being guided by guiding means (not shown).

Moreover, position data detected by the rotary encoder (not shown) is fed back as a position feedback signal, and the difference value (differential value) obtained every sampling interval is also fed back as a speed feedback signal to each of the Za-axis feed control section 21, the Ya-axis feed control section 31, the Xa-axis feed control section 41, the Zb-axis feed control section 51 and the Xb-axis feed control section 61.

In the NC lathe 100 equipped with the two tool rests 106 and 108, that is, the first tool rest 106 and the second tool rest 108, these tool rests 106 and 108 have considerable weights. For this reason, the form of the bed 101 of the NC lathe 100 is changed by the movement of each of the tool rests 106 and 108. Therefore, when the first tool rest 106 is moved in the Za-axis direction for example, the position of the second tool rest 108 in the Zb-axis direction or the Xb-axis direction is displaced depending on the position of the movement. Similarly, when the second tool rest 108 is moved in the Zb-axis direction for example, the position of the first tool rest 106 in the Za-axis direction or the Xa-axis direction is displaced depending on the position of the movement.

When the first tool rest 106 or the second tool rest 108 is displaced as described above, the positional relationship between the spindle 102 and the first tool rest 106 is changed, and the positional relationship between the spindle 102 and the second tool rest 108 is also changed. This impairs the rectilinearity of the first tool rest 106 in the Za-axis direction and the Xa-axis direction, and also impairs the rectilinearity of the second tool rest 108 in the Zb-axis direction and the Xb-axis direction, thereby lowering machining accuracy.

In order to solve this problem, the displacements of the first tool rest 106 and the second tool rest 108 are corrected by the correction apparatus 1 comprising the correction amount storage section 2, the correction amount setting section 3 and the correction execution section 4 in this embodiment. The correction apparatus 1 of this embodiment is configured to correct the displacement of the second tool rest 108 in the Xb-axis direction caused depending on the position of the first tool rest 106 in the Za-axis direction, and to correct the displacement of the first tool rest 106 in the Xa-axis direction caused depending on the position of the second tool rest 108 in the Zb-axis direction. This correction is explained in the following descriptions. However, the correction apparatus 1 may also be configured to correct displacements in the other axis directions.

A correction amount for canceling the displacement of the second tool rest 108 in the Xb-axis direction caused depending on the position of the first tool rest 106 in the Za-axis direction and a correction amount for canceling the displacement of the first tool rest 106 in the Xa-axis direction caused depending on the position of the second tool rest 108 in the Zb-axis direction are stored in the correction amount storage section 2 in advance via an input device (not shown).

The correction amounts are set as described below. The positional relationships between the first tool rest 106 and the second tool rest 108 in the Za-axis direction and the Zb-axis direction are changed whenever necessary. The displacements of the first tool rest 106 and the second tool rest 108 in the Xa-axis direction and the Xb-axis direction in each of the positional relationships therebetween are measured. The correction amounts are set as values for canceling the measured displacements.

Figure 3:
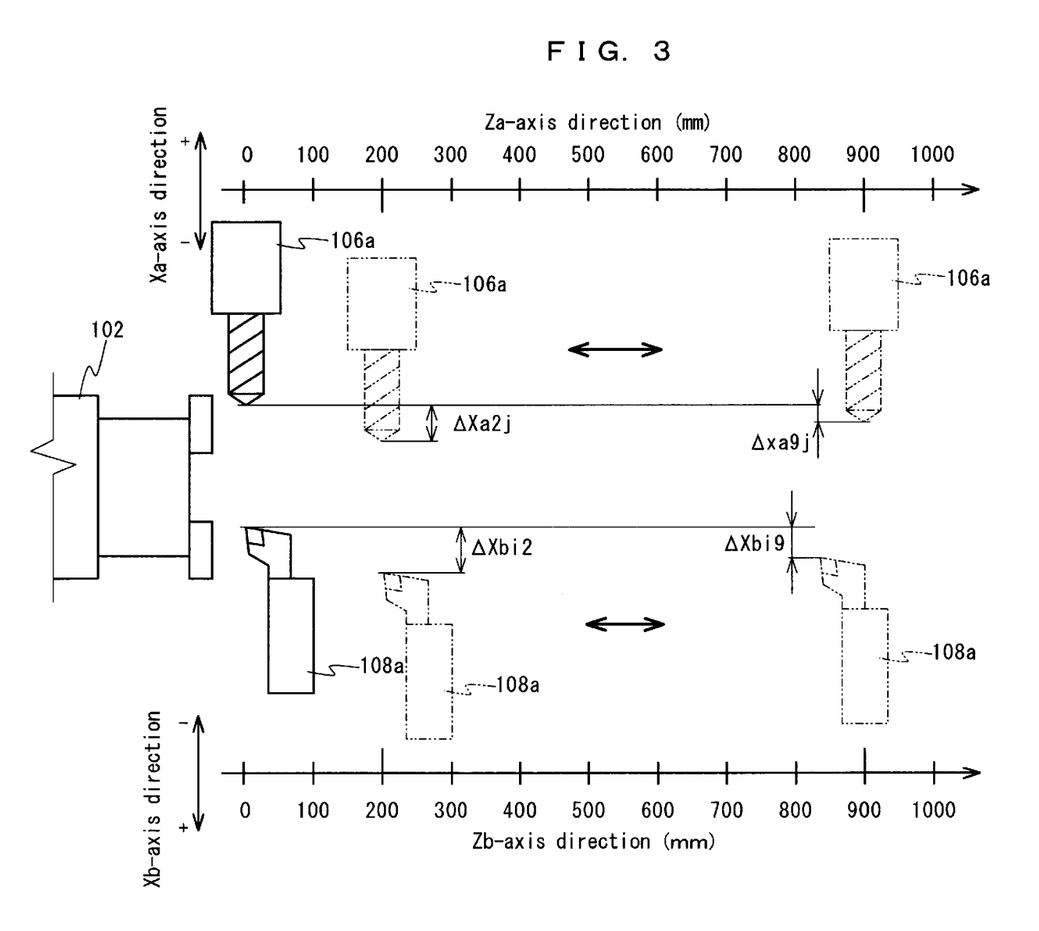
FIG. 3 is a view for explaining the displacement amounts of tool rests in accordance with this embodiment.

The setting of the correction amounts will be described below in more detail referring to FIG. 3. In FIG. 3, the first tool rest 106 and the second tool rest 108 are not shown.

First, when the first tool rest 106 is positioned at 0 mm in the Za-axis direction and when the second tool rest 108 is positioned at 0 mm in the Zb-axis direction, the position of the tip of a tool 106a on the first tool rest 106 in the Xa-axis direction and the position of the tip of a tool 108a on the second tool rest 108 in the Xb-axis direction are measured as reference positions.

Next, while the first tool rest 106 is positioned at 0 mm in the Za-axis direction, the second tool rest 108 is moved from 0 mm to 1000 mm in 100 mm intervals in the Zb-axis direction. The position of the tip of the tool 106a in the Xa-axis direction and the position of the tip of the tool 108a in the Xb-axis direction are measured at each position of the second tool rest 108. Then, each time the first tool rest 106 is moved in 100 mm intervals in the Za-axis direction, the second tool rest 108 is moved from 0 mm to 1000 mm in 100 mm intervals in the Zb-axis direction. The position of the tip of the tool 106a in the Xa-axis direction and the position of the tip of the tool 108a in the Xb-axis direction are measured at each position of the second tool rest 108. The difference between the measured value and the reference value is obtained and set as each of the displacement amounts ($\Delta$Xaij, $\Delta$Xbij, i=0 to 10, j=0 to 10) of the first tool rest 106 and the second tool rest 108 at each position.

Figure 4:
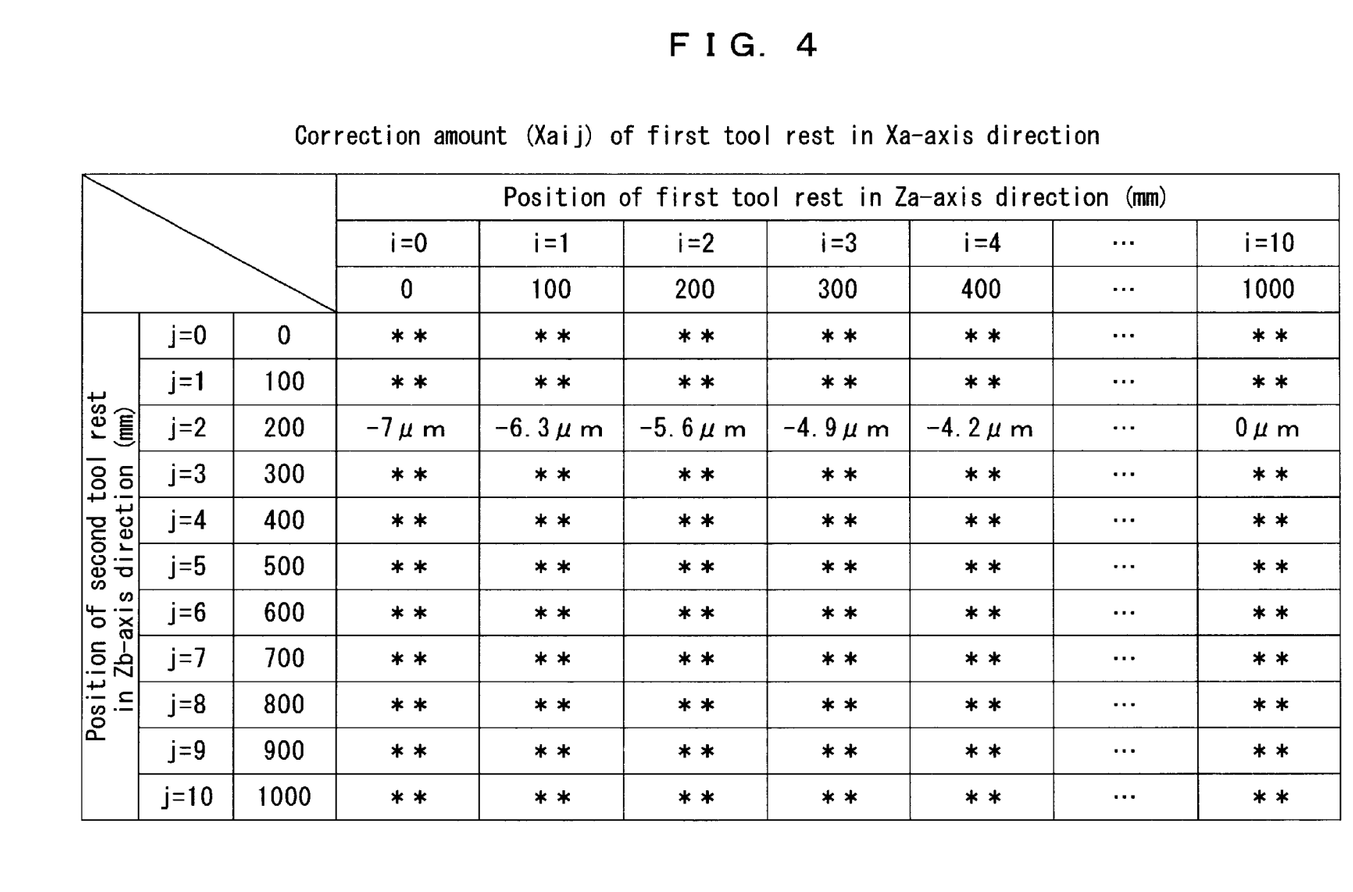
FIG. 4 is a view for explaining the data structure of correction amounts to be stored in a correction amount storage section in accordance with this embodiment.
Figure 5:
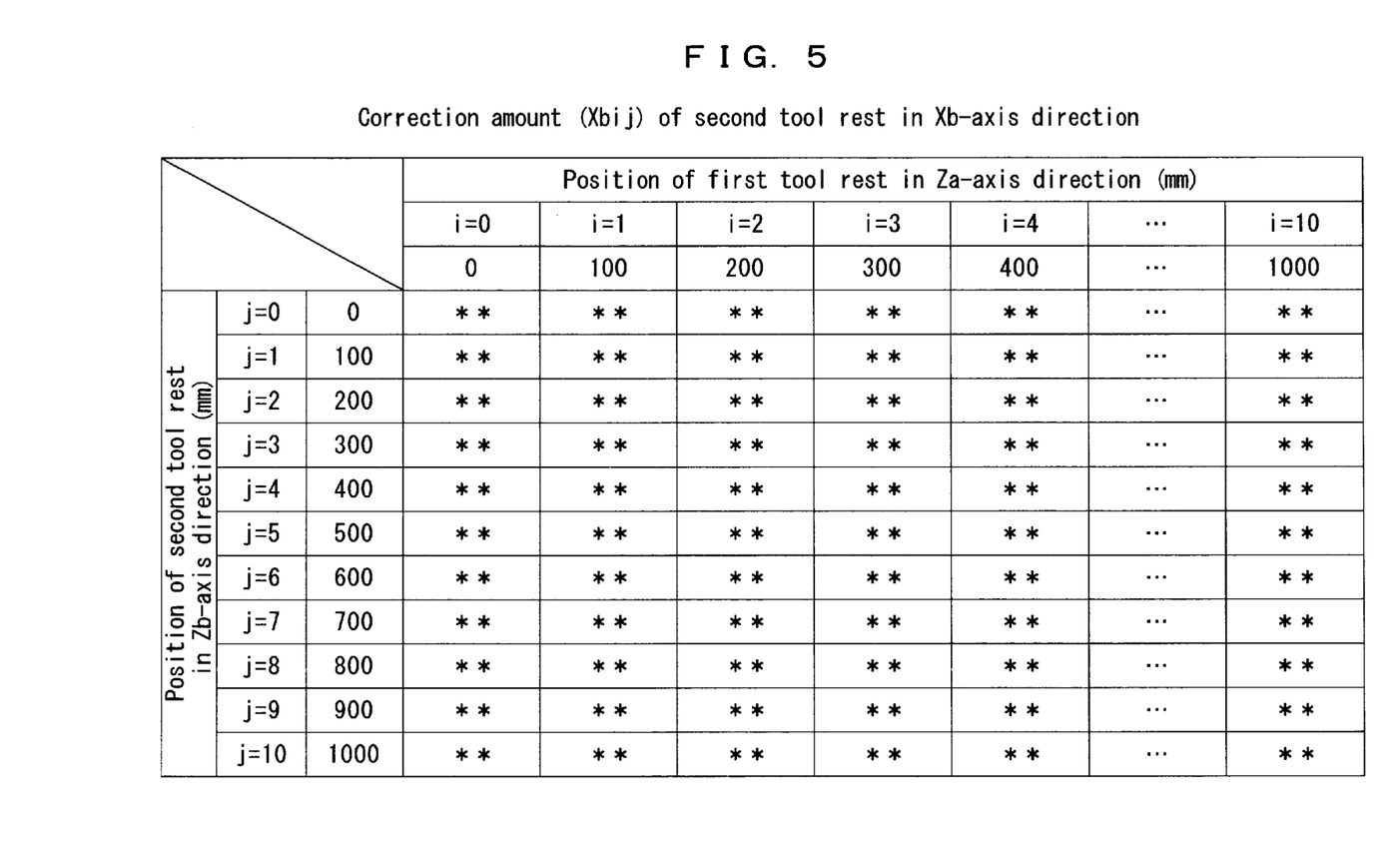
FIG. 5 is another view for explaining the data structure of correction amounts to be stored in the correction amount storage section in accordance with this embodiment.

The sign of each displacement amount measured as described above is reversed, and the amount obtained in this way is set as each of the correction amounts of the first tool rest 106 in the Xa-axis direction and the correction amounts of the second tool rest 108 in the Xb-axis direction at each position of the first tool rest 106 in the Za-axis direction and at each position of the second tool rest 108 in the Zb-axis direction. The correction amounts are stored in the correction amount storage section 2 as the data tables shown in FIGS. 4 and 5. In FIGS. 4 and 5, specific numerical values, exclusive of some numerical values, are not indicated.

On the basis of the movement target position data regarding the first tool rest 106 and the second tool rest 108, which is received from the operation command generation section 12, the correction amount setting section 3 searches correction amounts stored in the correction amount storage section 2. Next, the correction amount setting section 3 reads the correction amounts of the second tool rest 108 in the Xb-axis direction depending on the position of the first tool rest 106 in the Za-axis direction and the correction amounts of the first tool rest 106 in the Xa-axis direction depending on the position of the second tool rest 108 in the Zb-axis direction. The correction amount setting section 3 then sets correction amounts for correction execution on the basis of the correction amounts having been read, and transmits the correction amounts having been set to the correction execution section 4.

More specifically, for example, when it is assumed that the second tool rest 108 is moved from Zb=400 mm to Zb=200 mm while the first tool rest 106 is at rest at the position of Za=200 mm, the data table shown in FIG. 4 is searched on the basis of these data. The correction amount –5.6 $\mu$m at the time when the first tool rest 106 is at the position of Za=200 mm and when the second tool rest 108 is at the position of Zb=200 mm is read from the correction amount storage section 2 and transmitted to the correction execution section 4.

The correction amount at an intermediate position between positions set in the data table, that is, the correction amount at the time when the second tool rest 108 is moved from Zb=400 mm to Zb=250 mm for example, can be calculated and set by carrying out interpolation on the basis of the correction amounts at the positions of Zb=200 mm and Zb=300 mm.

The correction execution section 4 corrects the movement target position data on the basis of the correction amounts received from the correction amount setting section 3. More specifically, the correction amounts received from the correction amount setting section 3 are processed to generate a correction signal regarding the first tool rest 106 in the Xa-axis direction and a correction signal regarding the second tool rest 108 in the Xb-axis direction. The generated correction signal regarding the first tool rest 106 is added to the operation command signal transmitted from the operation command generation section 12 to the Xa-axis feed control section 41. The generated correction signal regarding the second tool rest 108 is added to the operation command signal transmitted from the operation command generation section 12 to the Xb-axis feed control section 61. This corrects the movement target position of the first tool rest 106.

As detailed above, in the correction apparatus 1 of this embodiment, the displacement amount of the second tool rest 108 in the Xb-axis direction caused depending on the position of the first tool rest 106 in the Za-axis direction and the displacement amount of the first tool rest 106 in the Xa-axis direction caused depending on the position of the second tool rest 108 in the Zb-axis direction are measured in advance. On the basis of the measured displacement amounts, correction amounts for canceling the displacement amounts are set and stored in the correction amount storage section 2 in advance. The correction amount setting section 3 reads the correction amount corresponding to the movement target position of the first tool rest 106 in the Za-axis direction and the correction amount corresponding to the movement target position of the second tool rest 108 in the Zb-axis direction from the correction amount storage section 2. On the basis of the correction amounts, correction amounts for correction execution are set. On the basis of the correction amounts having been set, the correction execution section 4 corrects the movement target position data regarding the first tool rest 106 in the Xa-axis direction and the second tool rest 108 in the Xb-axis direction. Hence, the rectilinearity of the first tool rest 106 and the second tool rest 108 can be within a predetermined allowable range by the above-mentioned correction, whereby machining accuracy can be improved.

Although an embodiment of the present invention has been described above, embodiments specifically attainable by the present invention are not limited to this embodiment.

The above-mentioned embodiment is configured so as to correct the movement target position data regarding the second tool rest 108 in the Xb-axis direction depending on the position of the first tool rest 106 in the Za-axis direction and the movement target position data regarding the first tool rest 106 in the Xa-axis direction depending on the position of the second tool rest 108 in the Zb-axis direction. However, the configuration of the embodiment is not limited to this configuration. For example, the embodiment may be configured so as to correct the movement target position data regarding the second tool rest 108 in the Zb-axis direction depending on the position of the first tool rest 106 in the Za-axis direction and the movement target position data regarding the first tool rest 106 in the Za-axis direction depending on the position of the second tool rest 108 in the Zb-axis direction. Furthermore, the embodiment may also be configured so as to correct the movement target position data regarding the second tool rest 108 in the Zb-axis direction or the Xb-axis direction depending on the position of the first tool rest 106 in the Xa-axis direction and the movement target position data regarding the first tool rest 106 in the Za-axis direction or the Xa-axis direction depending on the position of the second tool rest 108 in the Xb-axis direction.

What is claimed is:

1. A correction apparatus for an NC lathe equipped with a spindle, at least two tool rests provided so as to be movable in the direction along the axis of said spindle and in the direction perpendicular to the axis of said spindle, feed mechanisms for moving each of said tool rests in said directions, and a feed controller for generating movement target position data regarding each of said tool rests, for numerically controlling said feed mechanisms on the basis of the generated movement target position data and for moving each of said tool rests to its movement target position, said correction apparatus for correcting the movement target positions of said tool rests, the movement positions of which are numerically controlled on the basis of said movement target position data, comprising:
a correction amount setting section for receiving said movement target position data from said feed controller, for recognizing the position of each of said tool rests in the direction along the axis of said spindle and/or in the direction perpendicular to the axis of said spindle on the basis of the received movement target position data, and for setting correction amounts for canceling the displacements of the other tool rest in the direction along the axis of said spindle and/or in the direction perpendicular to the axis of said spindle caused depending on the position of the one of said tool rests in the direction along the axis of the spindle and/or in the direction perpendicular to the axis of said spindle, and
a correction execution section for correcting said movement target position data for said other tool rest on the basis of the correction amounts having been set by said correction amount setting section.

2. A correction apparatus for an NC lathe in accordance with claim 1, further comprising a correction amount storage section for storing the correction amounts for canceling the displacements of said other tool rest in the direction along the axis of said spindle and/or in the direction perpendicular to the axis of said spindle caused depending on the position of the one of said tool rests in the direction along the axis of said spindle and/or in the direction perpendicular to the axis of said spindle, wherein
said correction amount setting section searches data stored in said correction amount storage section on the basis of said movement target position data regarding each of said tool rests, which is received from said feed controller, reads correction amounts corresponding to the positions of the one of said tool rests in the direction along the axis of said spindle and/or in the direction perpendicular to the axis of said spindle, and sets correction amounts for correction execution on the basis of the correction amounts having been read.

* * * * *